US011165778B1

(12) United States Patent
Schroeder et al.

(10) Patent No.: US 11,165,778 B1
(45) Date of Patent: *Nov. 2, 2021

(54) SEGMENTATION BASED NETWORK SECURITY

(71) Applicant: United Services Automobile Association (USAA), San Antonio, TX (US)

(72) Inventors: Eric David Schroeder, San Antonio, TX (US); Justin Dax Haslam, San Antonio, TX (US); Donnette Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/736,420

(22) Filed: Jan. 7, 2020

Related U.S. Application Data

(63) Continuation of application No. 15/805,808, filed on Nov. 7, 2017, now Pat. No. 10,574,654.

(51) Int. Cl.
*H04L 29/06* (2006.01)
*H04L 29/12* (2006.01)
*H04L 29/08* (2006.01)

(52) U.S. Cl.
CPC .......... *H04L 63/10* (2013.01); *H04L 61/1511* (2013.01); *H04L 61/6022* (2013.01); *H04L 67/12* (2013.01); *H04L 67/42* (2013.01)

(58) Field of Classification Search
CPC . H04L 63/10; H04L 61/1511; H04L 61/6022; H04L 67/12; H04L 67/42
USPC .......................................................... 726/4
See application file for complete search history.

(56) References Cited

U.S. PATENT DOCUMENTS

| | | | |
|---|---|---|---|
| 7,340,597 B1 * | 3/2008 | Cheriton | G06F 21/554 713/100 |
| 7,724,685 B2 | 5/2010 | Choudhury | |
| 8,214,880 B1 * | 7/2012 | Wu | H04L 63/0876 726/3 |
| 2006/0041937 A1 * | 2/2006 | Chandley | H04L 63/104 726/12 |
| 2006/0137005 A1 * | 6/2006 | Park | H04L 29/12839 726/21 |

(Continued)

*Primary Examiner* — Michael S McNally
(74) *Attorney, Agent, or Firm* — Fish & Richardson P.C.

(57) ABSTRACT

Methods, systems, and apparatus, including computer programs encoded on a computer storage medium, for receiving, by a network device, a request from a computing device to join a network, where the network is segmented to include a provisioning network, a first network segment, and a second network segment, and the second network segment provides limited network access privileges to computing devices compared to network access privileges provided by the first network segment. Providing the computing device access to the provisioning network. Determining, while the computing device is connected to the provisioning network, properties of the computing device. Selecting which of the first network segment and the second network segment to assign access to the computing device based on the properties of the computing device. Providing security credentials to the computing device for accessing the selected one of the first network segment or the second network segment.

20 Claims, 3 Drawing Sheets

(56) References Cited

U.S. PATENT DOCUMENTS

| | | | | |
|---|---|---|---|---|
| 2008/0109867 A1* | 5/2008 | Panabaker | ............ | H04L 63/102 |
| | | | | 726/1 |
| 2010/0071020 A1* | 3/2010 | Addington | ......... | H04N 7/17318 |
| | | | | 725/132 |
| 2012/0259990 A1* | 10/2012 | Akisada | .............. | H04L 41/0806 |
| | | | | 709/228 |
| 2012/0266223 A1* | 10/2012 | Yegin | .................. | H04L 63/0807 |
| | | | | 726/7 |
| 2013/0332996 A1* | 12/2013 | Fiala | ....................... | G06F 21/53 |
| | | | | 726/4 |
| 2015/0236935 A1 | 8/2015 | Bassett | | |
| 2016/0259932 A1* | 9/2016 | Lakshmanan | ........... | G06F 21/44 |
| 2017/0078168 A1 | 3/2017 | Harris et al. | | |
| 2018/0069878 A1* | 3/2018 | Martini | ................. | H04L 63/164 |

\* cited by examiner

SEGMENTATION BASED NETWORK SECURITY

CROSS-REFERENCE TO RELATED APPLICATION

This application is a continuation application of and claims priority under 35 U.S.C. § 120 to U.S. application Ser. No. 15/805,808, filed on Nov. 7, 2017, the entire contents of which is incorporated herein by reference.

BACKGROUND

The number and variety of network capable devices has increased greatly in recent years with the advent of "smart" devices. However, the increased the number of devices connected to a network increases the risks of network security breaches. For example, some "smart" devices (e.g., Internet of Things (IoT) devices) can be subject to malicious software attacks and gain access to secure information from other network devices (e.g., computers and smartphones). Improvements in network security that take into account the varied operations of network capable devices are desirable.

SUMMARY

Implementations of the present disclosure are generally directed to systems and methods for controlling access to network resources by computing devices connected to the network. More particularly, implementations of the present disclosure segment a network into network segments that each provide different access privileges to computing devices that are connected to the segment. For example, in operation, a new computing device is assigned first to a provisioning network. While connected to the provisioning network, a network device determines the properties of the new network capable device. The network device assigns the new computing device to an appropriate network segment based on its properties. Each network segment may provide different network access privileges to the computing devices assigned to it. Thus, the segmentation may serve to separate less secure devices (e.g., IoT devices) from trusted computing devices (e.g., home computers, tablets, smartphones, etc.).

In general, innovative aspects of the subject matter described in this specification can be embodied in methods that include the actions of receiving, by a network device, a request from a computing device to join a network, where the network is segmented to include a provisioning network, a first network segment, and a second network segment, and the second network segment provides limited network access privileges to computing devices compared to network access privileges provided by the first network segment. Providing the computing device access to the provisioning network. Determining, while the computing device is connected to the provisioning network, properties of the computing device. Selecting which of the first network segment and the second network segment to assign access to the computing device based on the properties of the computing device. Providing security credentials to the computing device for accessing the selected one of the first network segment or the second network segment.

Other implementations of this aspect include corresponding systems, apparatus, and computer programs, configured to perform the actions of the methods, encoded on computer storage devices. These and other implementations can each optionally include one or more of the following features.

In some implementations, determining the properties of the computing device includes obtaining identification information associated with the computing device, and accessing the properties of the computing device from a server system based on the identification information.

In some implementations, determining the properties of the computing device includes providing the computing device access to an observation network segment, wherein the observation network segment prevents the computing device from interacting with other computing devices connected to the network, and determining the properties of the computing device by monitoring operations of the computing device while on the observation network segment.

In some implementations, selecting which of the first network segment and the second network segment to assign access to the computing device includes selecting the second network segment in response to determining that the computing device is likely an internet of things (IoT) device.

In some implementations, selecting which of the first network segment and the second network segment to assign access to the computing device includes selecting the first network segment in response to determining that the computing device is likely a trusted computing device.

In some implementations, selecting which of the first network segment and the second network segment to assign access to the computing device includes determining a trustworthiness of the computing device based on the properties of the computing device, and selecting which of the first network segment and the second network segment to assign access to the computing device based on the trustworthiness of the computing device. In some implementations, determining the trustworthiness of the computing device includes comparing the properties of the computing device to one or more profiles of trusted and untrusted computing devices.

In some implementations the operations include storing identifying information for the computing device.

In some implementations, determining the properties of the computing device includes identifying that the device has previously been assigned to one of the first network segment or the second network segment and, in response, reassigning the computing device to a network segment to which it had previously been assigned.

In some implementations, the properties of the computing device include one or more of: a media access control (MAC) address, computing device type, communication requirements of the computing device, identification of external webservers with which the computing device communicates, location of external webservers with which the computing device communicates, or user specific information stored on the computing device.

In some implementations, limitations of the limited access privileges of the second network segment include one or more of: access to a limited set of network ports, access to a limited set of external websites, access to a limited set of external servers, a network bandwidth usage limitation, limited access to performing domain name searches (DNS), a file download limitation, or restricted interactions with other computing devices connected to the network.

In some implementations, the network device is a wireless network router, a wireless network hub, or a network switch.

In some implementations, providing the security credentials for accessing the selected one of the first network segment or the second network segment includes automatically providing a service set identifier (SSID) of the selected one of the first network segment or the second network segment and a uniquely generated temporary credential to the computing device for accessing the selected one of the first network segment or the second network segment.

These and other implementations can provide one or more advantages. In some examples, implementations of the present disclosure improve the security of wireless networks. For example, implementations may automatically place new network devices in appropriate network segments based on their operations. Implementations may provide improved network security by segmenting a network and restricting access to various network permissions, protocols, or other network devices and segments based on the needs of each network device. For example, each network segment may be associated with rules that govern the access permissions of devices assigned to that network segment. Implementations may permit the use of relatively unsecure network devices (e.g., some IoT devices) while maintaining a high degree of network security for trusted network devices (e.g., computers, smartphones, tablets, etc.). Implementations may provide improved network security when using IoT devices without the need for individual device level security protocols.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
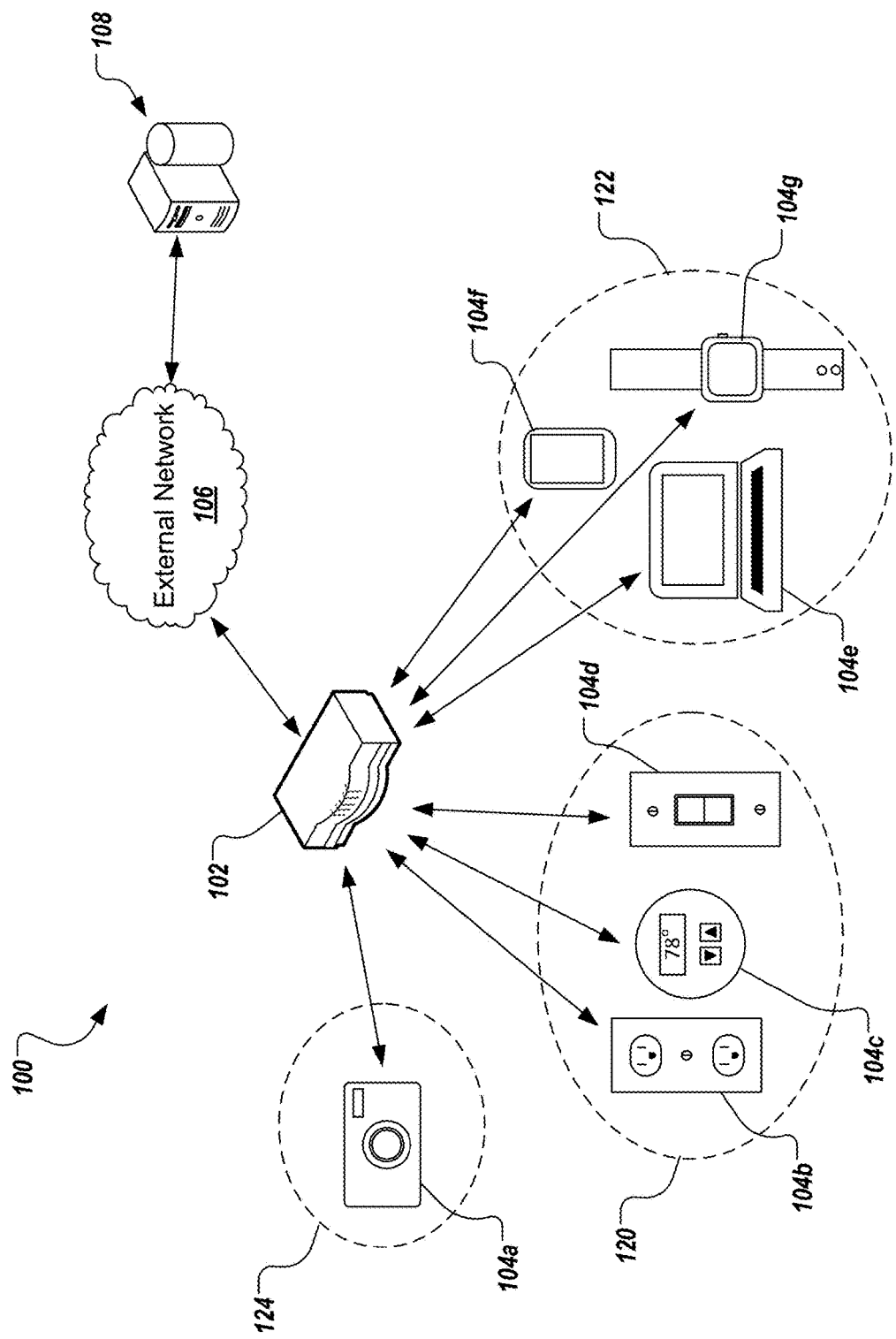
FIG. 1 depicts an example system in accordance with implementations of the present disclosure.

Implementations of the present disclosure are generally directed to systems and methods for controlling access to network resources by computing devices connected to the network. More specifically, implementations segment a computing network into a provisioning network and two or more operating network segments. For example, a network device (e.g., a wireless network router) can segment a local area network (LAN) into a provisioning network that is visible (e.g., network identification information is broadcasted) to computing devices and one or more operating network segments that are not visible to computing devices. The network device initially confines new computing devices that request access to the network to the provisioning network. When a new computing device is connected to the provisioning network, the networking device evaluates properties of the new computing device to determine which of the operating network segments to assign the new computing device to. Each of the operating network segments provides different network access privileges. The network device assigns the new computing device to the operating network segment that has appropriate access privileges for the new computing device based on properties of the new computing device. For example, highly trustworthy computing devices are assigned to an operating network with more privileges (e.g., a trusted network segment) than less trustworthy computing devices (e.g., IoT devices). Less trustworthy computing devices are assigned to an operating network segment with limited network privileges.

For example, when network device (e.g., a WiFi access point) receives a request from a web-based security camera to join its network, the network device can assign the camera first to a provisioning network where it can gather information about the camera. The network device can gather information about the camera directly from the camera itself, from an external database (e.g., a crowd sourced database or a manufacturer database), from a machine learning algorithm, or by monitoring the operation of the camera for a period of time. The network device can then select an appropriate network segment for the camera. For example, a web-based camera may require access to an external server to store video or images, but should not have direct access to other computing devices such as a home computer. In addition, a web-based camera may need to upload data, but may generally not need to download files autonomously. Therefore, the network device may assign the web-based camera to a network segment for IoT types of devices.

The network segment may provide such devices with access to upload information to an external network, but limit downloads from the external network. For example, the camera may be permitted to upload video to a cloud server hosted by the camera's manufacturer, but only permitted to download data (e.g., software updates) with user approval. In addition, the network segment may restrict access to devices on other network segments or even restrict communications between devices on the same network segment. For example, the camera may not be permitted to communicate with other network devices to prevent the camera from accessing private user information stored on other devices (e.g., a home computer). However, the network segment may permit the communications from another network device (e.g., a home computer) if the home computer initiates the communication. For example, if the user launches a wizard to change settings on the camera or view video from the camera.

FIG. 1 depicts an example system 100 that can execute implementations of the present disclosure. The system 100 includes a network device 102, a plurality of computing devices 104a-104g (referred to collectively as 104), external network 106, and computing systems 108, 110.

The network device 102 is configured to establish and manage a local network (e.g., WiFi network). For example, the network device 102 can include executable software that causes the network device 102 to establish and manage a local network according to implementations of the present disclosure. The network device 102 can include one or more processors and a data store coupled to the processors storing the executable software. For example, the network device 102 can be a wireless network router, a wireless network hub, a wired network router, or a network switch.

The network device 102 establishes a local network for computing devices 104. For example, the network device 102 can perform network operations including, but not limited to, managing the operations of computing devices 104 on the network, providing access permissions and limitations the operations of computing devices 104 on the local network, authorizing new devices to be added to the local network, and providing access to the external network 106. Computing devices 104 can include, but are not limited to, desktop computers, laptop computers, tablet computers, smartphones, and IoT devices. Example IoT devices include, but are not limited to, web cameras (e.g., for home security systems), smart door locks, smart appliances, object tracking devices (e.g., a smart key fob), smart plugs, smart light switches, smart thermostats, smart ventilations systems, smart window blinds, and home assistants. External network 106 can include a large network or combination of networks, such as a local area networks (LAN), wide area network (WAN), the Internet, a cellular network, a satellite network, or a combination thereof connecting any number of mobile clients, fixed clients, and servers.

The network device 102 segments the local network in to at least two network segments 120, 122, and a provisioning network 124. Each of network segments 120 and 122 provides different network access privileges to the computing devices assigned to it. For example, computing devices 104b, 104c, and 104d assigned to network segment 120 are subject to different network privileges and/or restrictions than computing devices 104e, 104f, and 104g assigned to network segment 122. For example, network segment 120 may be configured for use with less trusted computing devices 104 (e.g., IoT devices) by providing more restricted network privileges than network segment 122. For example, restricted network privileges can include, but are not limited to, access to a limited set of network ports, access to a limited set of external websites, access to a limited set of external servers, a network bandwidth usage limitation, limited access to performing domain name searches (DNS), a file download limitation, or restricted interactions with other computing devices connected to the network.

The provisioning network 124 is used to gather information about new computing devices, such as computing device 104a, in order to assign the new device to an appropriate network segment. For example, when the network device 102 receives a request to join the local network from the new computing device 104a, the network device 102 can assign the new computing device 104a to the provisioning network 124. The network device 102 can use the provisioning network 124 to isolate the new device 104a to the provisioning network so that it cannot access other computing devices on the local network (e.g., computing devices 104b-104g). For example, isolating new devices to the provisioning network 124 may prevent them from conducting malicious operations on the other computing devices (e.g., 104b-104g) connected to the local network. In some implementations, the network device 102 makes only the provisioning network 102C visible to new computing devices, such as computing device 104a (e.g., a new webcam). For example, the networking device 102 may only broadcast network identification information for the provisioning network and not for any of the other network segments 120A, 120B.

The network device 102 determines properties of the new computing device 104a while the new computing device 104a is assigned to the provisioning network 124. The network device 102 can use the properties of the new computing device 104a to select an appropriate network segment for the new device. Example properties of the new computing device 104a can include, but are not limited to, a media access control (MAC) address, computing device type, communication requirements of the computing device, identification of external webservers with which the computing device communicates, location of external webservers with which the computing device communicates, functions of the computing device, user specific information stored on the computing device, or whether or not the computing device is a guest device (e.g., a friend's smartphone).

For example, the network device 102 can query the new computing device 104a to determine properties of the device. For example, the network device 102 can obtain identification information such as a media access control (MAC) address of the device. In some examples, the network device 102 may be able to determine the device type by querying the device. For example, the network device 102 can determine whether the new computing device 104a is highly functional device such as a computer (e.g., desktop, laptop, tablet), a smartphone or an IoT device such as a webcam, or other "smart" device. For example, the new device 104a may send data to the network device 104a indicating what type of device it is. In some implementations, the network device 102 can access properties of the new device from an external server system 108 such as a manufacturer database or a crowd sourcing database. In some examples, the network device 102 can query properties of the new computing device 104a from the server system 108 based on the new computing device's 104a identification information. In some implementations, the network device 102 can provide a network registration wizard for display the new computing device, or another computing device, to allow a user to enter information about properties of the new computing device 104a.

The network device 102 selects which network segment to assign the new computing device 104a to based on the properties of the device. For example, the network device 102 can assign the new computing device 104a to a network segment that is appropriate for its operations. For example, a computing device 104 that requires limited network privileges (e.g., a smart plug) can be assigned to a network segment with limited network access privileges (e.g., an IoT network segment). By contrast, a computing device 104 that requires broad access privileges (e.g., a home computer) can be assigned to a network segment that has minimal or no restrictions on network access (e.g. a "trusted" network segment).

The network device 102 can use rules, device profiles, or a combination thereof to select an appropriate network segment for the new computing device 104a. For example, the network device 102 can compare the properties of the new computing device 104a to a set of device profiles of known computing devices 104. The network device 102 can determine a trustworthiness of the new computing device 104a based on the comparison. For example, if the properties of the new computing device 104a are similar to a trusted computing device (e.g., a home computer) then the network device 104a can allocate a high value of trustworthiness to the new computing device 104a. As another example, if the properties of the new computing device 104a are similar to an IoT device then the network device 104a can allocate a moderate or low value of trustworthiness to the new computing device 104a. In some examples, some types of IoT devices may be allocated high values of trustworthy while other types are allocated lower values of trustworthiness. For example, web-based security cameras may be more trustworthy devices than smart plugs. As another example, even devices of the same type (e.g., two cameras) may be allocated different values of trustworthiness. For instance, a camera manufactured by a manufacturer that incorporates network security measures in their devices may be allocated a higher trustworthiness value than a camera manufactured by another manufacturer that does not.

In some implementations, the network device can access computing device profiles from an external sever system 108. For example, the network device 102 can access computing device profiles from a crowd sourcing server or a machine learning server.

The network device 102 can assign the new computing device 104a to a network segment based on the determined trustworthiness of the device. For example, more trustworthy devices can be assigned to network segments that provide broader network access privileges and less restrictions, whereas less trustworthy devices can be assigned to network segments that provide less access privileges and more restrictions.

The network device 102 can provide the new computing device 104a with security credentials to join the selected network. For example, in some implementations the network segments are hidden, (e.g., the network identification information for the network segments is not broadcasted). The network device 102 can send the network identification (e.g., service set identifier (SSID)) for the selected network segment to the new computing device 104a. In some examples, the network device 102 can send network security credentials to the new computing device 104a for joining the selected network segment. For example, the network device 102 can send a uniquely generated temporary credential to the computing device for accessing the selected network segment to the new computing device 104a.

In some implementations, the network device 102 can store information about the new computing device 104a. For example, the network device 102 can store identification information (e.g., MAC address) of the new computing device 104a so that if the device is disconnected from the local network it can be efficiently reassigned to the same network segment without having to re-determine the properties of the device. In some implementations, the network device 102 can store the new computing device's 104a identification information in association with data identifying which network segment the device was assigned to.

In some implementations, after receiving identification information from a new computing device 104a, the network device 102 can search determine whether or not the new computing device 104a had been previously connected to the local network by identifying whether the new computing device's 104a identification information is stored. If so, the network device 102 can reassign the new computing device 104a to the same network segment to which it was previously assigned.

In some implementations, the network device 102 can determine properties of the new computing device 104a by monitoring operations of the new computing device 104a. For example, the network device 102 can assign the new computing device 104a to an observation network segment. The observation network segment can be, for example, a sandbox environment. For example, the observation network segment can be isolated from other network segments to prevent the new computing device 104a from interacting with other computing devices 104b-104g connected to the local network, but permit the new computing device 104a to access the external network 106 and external server systems 108. The network device 102 can determine, based on monitoring the operations of the computing device 104a, which external server systems 108 (e.g., webservers, websites) the new computing device 104a communicates with. Some external server systems 108 can be deemed more or less trustworthy than others. The network device 102 can associate a trustworthiness with the new computing device 104a based on the trustworthiness of the webservers/websites with which the new computing device 104a communicates. As another example, the network device 102 can identify geographic locations of server systems 108 with which the new computing device 104a communicates. For example, server systems 108 located in some geographic regions can be deemed more or less trustworthy than others. The network device 102 can associate a trustworthiness with the new computing device 104a based on the trustworthiness of the geographic locations of the external servers 108 with which the new computing device 104a communicates.

In some implementations, the network device includes or can access a cloud based machine learning model that has been trained to receive model inputs related to a computing device (e.g., properties of the device) and to generate an output indicating a trustworthiness of the computing devices. The network device can then assign the computing device to a network segment based on the trustworthiness determined by the machine learning model. For example, the machine learning model can be trained to receive model inputs and to generate a predicted output for each received model input. In some implementations, the machine learning model is a deep model that employs multiple layers of models to generate an output for a received input. For example, the machine learning model may be a deep neural network. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a shallow machine learning model, e.g., a linear regression model or a generalized linear model.

In some implementations, the network device 102 can provide the ability for a user to define or adjust device profiles, network segments (e.g., number and type of network segments), network privileges and restrictions associated with one or more of the network segments, and rules for assigning computing devices to the different network segments.

Figure 2:
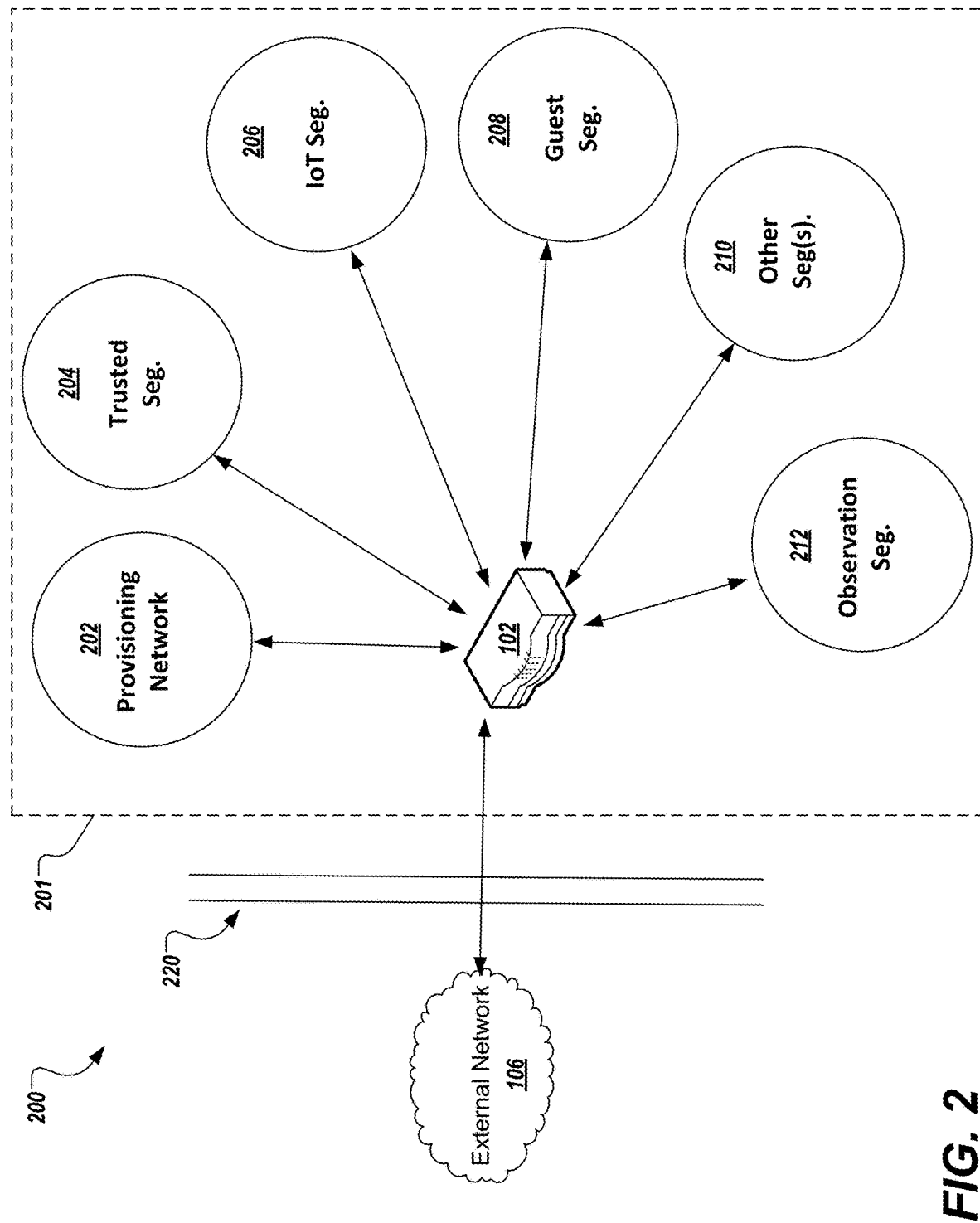
FIG. 2 depicts graphical representation of an example network segmentation architecture.

FIG. 2 depicts graphical representation 200 of a segmentation of an exemplary local network 201. The local network 201 is established and managed by network device 102. The local network includes a provisioning network 202 and several network segments 204-212. For example, the network segments can include, but are not limited to, a trusted device network segment 204, an IoT network segment 206, a guest device network segment 208, one or more other network segments 210, and an observation network segment 212. In some implementations, the local network 102 is separated from the external networks 106 by a firewall 220.

As discussed above, the provisioning network 202 can be used to configure network access for new computing devices joining the local network 201. In some implementations, the identification information (e.g., SSID) of the provisioning network 202 is broadcasted so that it can be identified by new computing devices.

The trusted network segment 204 can be configured for use with computing devices that the network device 102 identifies as being highly trustworthy computing devices. Trusted computing devices can be computing devices that store sensitive user data. For example, trusted computing devices can include, but are not limited to, home computers (e.g., desktops, laptops, tablets, etc.), smartphones, some wearable devices (e.g., smart watches). The trusted network segment 204 can be configured to provide broad network access privileges with minimal or no restrictions.

The IoT network segment 206 can be configured for use with computing devices that the network device 102 identifies as being IoT computing devices. The IoT network segment 206 can be configured to provide reduced network access privileges with more restrictions. For example, the IoT network segment 206 can be configured to include one or more of the following network access limitations: access to a limited set of network ports, access to a limited set of external websites, access to a limited set of external servers, a network bandwidth usage limitation, limited access to performing DNS searches, file download limitations, or restricted interactions with other computing devices connected to the network. In some implementations, the local network 201 can include several IoT network segments. For example, the local network 201 can include various levels of IoT network segments associated with different levels of trustworthiness or different functions of IoT devices. For example, a highly trustworthy IoT device may be assigned to a different IoT network segment than a less trustworthy IoT device.

The guest network segment 204 can be configured for use with computing devices that the network device 102 identifies as being guest computing devices. For example, the trusted network segment 204 can be configured to provide guest computing devices with access to external networks 106, but restrict access to computing devices on other network segments.

In some implementations, the provisioning network 202 and the network segments 204-212 can be subnetworks of the local network 201. In some implementations, the provisioning network 202 and the network segments 204-212 can be distinguished by rulesets. For example, the local network may not be divided into separate networks, but the rulesets applied to subsets of computing devices may server as a proxy for subnetworks. For example, a given "network segment" can be defined by a rules that are applied to a subset of network devices. The rules can govern the network access privileges and restrictions applied to those computing devices assigned to the particular ruleset (e.g., network segment). For example, a trusted device ruleset may be applied to a subset of trusted computing devices. As another example, an IoT ruleset may be applied to a subset of IoT computing devices.

Figure 3:
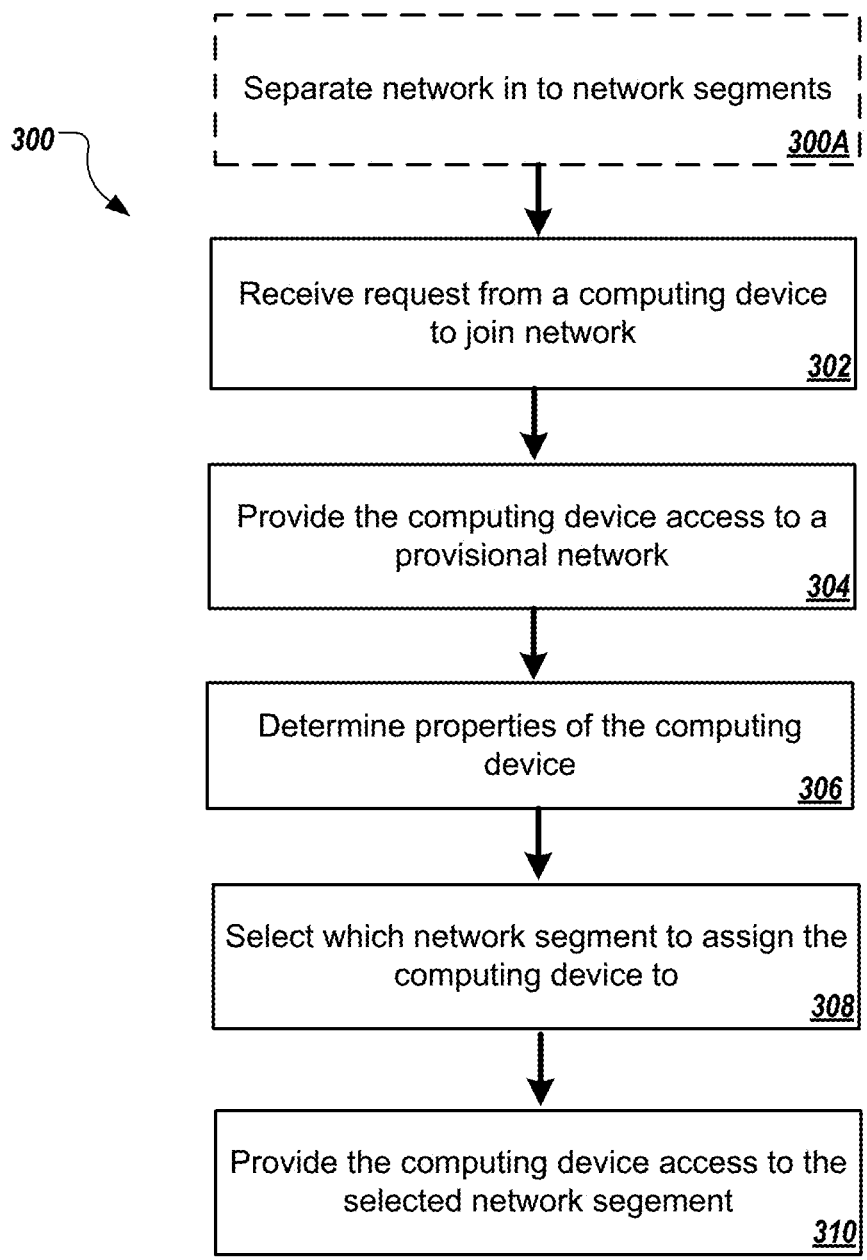
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example system 100 of FIG. 1. In some examples, the example process 300 can be provided by one or more computer-executable programs executed using one or more computing devices. For example, the example process 300, or portions thereof, can be provided by one or more programs executed by a network device (e.g., network device 102 of FIG. 1).

In some implementations, the network device can perform the optional preliminary step of separating a local network into network segments (300A). For example, when the network device establishes a local network (e.g., when the network device is initially setup or security segmentation software is installed), the network device can automatically separate the local network into network. The network device can automatically separate the local network into a providing network and a default number of network segments. In some implementations, the network device can cause a setup wizard to launch on a user's computing device (e.g., a home computer or an installation technician's computer). The network device may permit the user to customize aspects of the network segmentation through the setup wizard. For example, the user may be permitted to customize aspects including, but not limited to, the number and type of network segments, rules of assigning computing devices to the network segments, and privileges/restrictions associated with one or more of the network segments. As discussed above, in some implementations, the network segments can be formed as subnetworks. In some implementations, the network segments can be represented by network segment rulesets defining access privileges and restrictions for different sets of computing devices.

The network device receives a request from a computing device to join a network (302). For example, the network is segmented to include a provisioning network and one or more network segments, where a second network segment provides more limited network access privileges to devices connected thereto than a first network segment. For example, the first network segment may be a "trusted" network segment that provides broad network access privileges and the second network segment may be an IoT network segment that restricts the access privileges of computing devices connected thereto.

The network device provides the computing device access to the provisioning network (304). For example, the network device may broadcast identification information for the provisioning network, but not for the network segments. The network device can allow new devices to access the provisioning network but not the network segments. For example, this may protect the computing devices that are operating on the different network segments from a malicious attack by a new device. The network device can isolate computing devices that are connected to the provisioning network from accessing devices connected to one or more of the network segments.

The network device determines properties of the computing device (306). For example, the network device can determine the properties of the computing device while it is operating on the provisioning network. For example, the network device determines properties of the computing device that are indicative of the operational requirements of the device and/or the trustworthiness of the device. Operational requirements of the device can include, but are not limited to, whether the computing device needs access to an external network, whether the computing device needs to communicate with external server systems, identities of the external server systems that the computing device communicates with, locations of the external server systems that the computing device communicates with, whether the computing device needs to communicate with computing devices connected to any of the network segments, or whether any of the computing devices connected to any of the network segments need to communicate with the computing device. Example properties of the new computing device 104a can include, but are not limited to, a media access control (MAC) address, computing device type, communication requirements of the computing device, identification of external webservers with which the computing device communicates, location of external webservers with which the computing device communicates, functions of the computing device, user specific information stored on the computing device, or whether or not the computing device is a guest device (e.g., a friend's smartphone)

In some implementations, the network device can determine the properties of the computing device from information received by the network device from the computing device itself. For example, the network device can request and receive a device profile from the computing device. In some implementations, the network device can obtain information about the properties of the computing device from an external server system. For example, the network device can query properties of the computing device by sending identification information associated with the computing device (e.g., a MAC address) to an external server system. The external server system can include, but is not limited to, a manufacturer database, a crowd sourcing system, or a machine learning system. In some implementations, the network device can determine properties of the computing device by assigning the computing device to an observation network and monitoring the operations of the computing device.

The network device selects which network segment to assign the computing device to (308). For example, the network device can select which network segment to assign the computing device to based on the properties of the computing device. For example, the network device can apply one or more rulesets for selecting an appropriate network segment for the computing device. The network device can compare the properties of the computing device to profile of different types to determine a trustworthiness of the computing device. The network device can use the trustworthiness of the computing device and its operational requirements to select an appropriate network segment for the computing device.

The network device provides the computing device access to the selected network segment (310). For example, the network device can provide the computing device with security credentials for accessing the selected network segment. In some implementations, the network device automatically provides an SSID for the network segment and a unique set of temporary security credentials for the computing device to join the selected network segment.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD- ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., such as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A network access control system comprising:
at least one network device configured to perform operations comprising:
receiving a request from a computing device to join a network, the network being segmented to include a provisioning network, a first network segment, and a second network segment, each of the provisioning network, the first network segment, and the second network segment being separately addressable sub-networks of the network, wherein network identification information of the provisioning network is made public by the network device, and wherein the second network segment provides limited network access privileges to computing devices compared to network access privileges provided by the first network segment;
providing the computing device access to the provisioning network;
determining, while the computing device is connected to the provisioning network, properties of the computing device;
selecting, based on the properties of the computing device, which of the first network segment and the second network segment to assign access to the computing device; and
providing, to the computing device, a network identification and security credentials for accessing the selected one of the first network segment or the second network segment.

2. The system of claim 1, wherein determining the properties of the computing device comprises:
obtaining identification information associated with the computing device; and
accessing, based on the identification information, the properties of the computing device from a server system.

3. The system of claim 1, wherein determining the properties of the computing device comprises:
providing the computing device access to an observation network segment, wherein the observation network segment prevents the computing device from interacting with other computing devices connected to the network; and determining the properties of the computing device by monitoring operations of the computing device while on the observation network segment.

4. The system of claim 1, wherein selecting which of the first network segment and the second network segment to assign access to the computing device comprises selecting the second network segment in response to determining that the computing device is likely an internet of things (IoT) device.

5. The system of claim 1, wherein selecting which of the first network segment and the second network segment to assign access to the computing device comprises selecting the first network segment in response to determining that the computing device is likely a trusted computing device.

6. The system of claim 1, wherein selecting which of the first network segment and the second network segment to assign access to the computing device comprises:
   determining, based on the properties of the computing device, a trustworthiness of the computing device; and
   selecting which of the first network segment and the second network segment to assign access to the computing device based on the trustworthiness of the computing device.

7. The system of claim 6, wherein determining the trustworthiness of the computing device comprises comparing the properties of the computing device to one or more profiles of trusted and untrusted computing devices.

8. The system of claim 1, wherein the provisioning network, the first network segment, and the second network segment are each subnetworks.

9. The system of claim 1, wherein determining the properties of the computing device comprises identifying that the computing device has previously been assigned to one of the first network segment or the second network segment and, in response, reassigning the computing device to a network segment to which it had previously been assigned.

10. The system of claim 1, wherein the properties of the computing device include one or more of: a media access control (MAC) address, computing device type, communication requirements of the computing device, identification of external webservers with which the computing device communicates, location of external web servers with which the computing device communicates, or user specific information stored on the computing device.

11. The system of claim 1, wherein computing devices connected to the provisioning network are isolated from accessing other computing devices assigned to either the first network segment or the second network segment.

12. The system of claim 1, wherein identification information of the first network segment and identification information of the second network segment are hidden.

13. The system of claim 1, wherein each of the first network segment and the second network segment are associated a different ruleset defining network access privileges and restrictions.

14. A network device comprising:
   at least one processor; and a data store coupled to the at least one processor having instructions stored thereon which, when executed by the at least one processor, causes the at least one processor to perform operations comprising:
   receiving a request from a computing device to join a network, the network being segmented to include a provisioning network, a first network segment, and a second network segment, each of the provisioning network, the first network segment, and the second network segment being separately addressable subnetworks of the network, wherein network identification information of the provisioning network is made public by the network device, and wherein the second network segment provides limited network access privileges to computing devices compared to network access privileges provided by the first network segment;
   providing the computing device access to the provisioning network;
   determining, while the computing device is connected to the provisioning network, properties of the computing device;
   selecting, based on the properties of the computing device, which of the first network segment and the second network segment to assign access to the computing device; and
   providing, to the computing device, a network identification and security credentials for accessing the selected one of the first network segment or the second network segment.

15. The network device of claim 14, wherein the provisioning network, the first network segment, and the second network segment are each subnetworks.

16. The network device of claim 14, wherein computing devices connected to the provisioning network are isolated from accessing other computing devices assigned to either the first network segment or the second network segment.

17. The network device of claim 14, wherein selecting which of the first network segment and the second network segment to assign access to the computing device comprises selecting the second network segment in response to determining that the computing device is likely an internet of things (IoT) device.

18. The network device of claim 14, wherein identification information of the first network segment and identification information of the second network segment are hidden.

19. The network device of claim 14, wherein selecting which of the first network segment and the second network segment to assign access to the computing device comprises:
   determining, based on the properties of the computing device, trustworthiness of the computing device by comparing the properties of the computing device to one or more profiles of trusted and untrusted computing devices; and
   selecting which of the first network segment and the second network segment to assign access to the computing device based on the trustworthiness of the computing device.

20. A computer-implemented network access control method executed by at least one processor, the method comprising:
   receiving a request from a computing device to join a network, the network being segmented to include a provisioning network, a first network segment, and a second network segment, each of the provisioning network, the first network segment, and the second network segment being separately addressable subnetworks of the network, wherein network identification information of the provisioning network is made public by a network device, and wherein the second network segment provides limited network access privileges to computing devices compared to network access privileges provided by the first network segment;
   providing the computing device access to the provisioning network;

determining, while the computing device is connected to the provisioning network, properties of the computing device;

selecting, based on the properties of the computing device, which of the first network segment and the second network segment to assign access to the computing device; and providing, to the computing device, a network identification and security credentials for accessing the selected one of the first network segment or the second network segment.

\* \* \* \* \*

UNITED STATES PATENT AND TRADEMARK OFFICE
CERTIFICATE OF CORRECTION

PATENT NO.         : 11,165,778 B1
APPLICATION NO.    : 16/736420
DATED              : November 2, 2021
INVENTOR(S)        : Eric David Schroeder, Justin Dax Haslam and Donnette Moncrief Brown It is certified that error appears in the above-identified patent and that said Letters Patent is hereby corrected as shown below:

In the Claims

Column 15, Line 42, Claim 10, delete "web servers" and insert -- webservers --, therefor.

Signed and Sealed this
Nineteenth Day of April, 2022

Katherine Kelly Vidal
*Director of the United States Patent and Trademark Office*